United States Patent
Peirce

(10) Patent No.: US 8,997,865 B2
(45) Date of Patent: Apr. 7, 2015

(54) PROCESS OF SEALING A BREAKTHROUGH CREATED DURING THE PRODUCTION OF HYDROCARBONS IN A SUBTERRANEAN FORMATION

(75) Inventor: John W. Peirce, Anchorage, AK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 13/432,910

(22) Filed: Mar. 28, 2012

(65) Prior Publication Data
US 2012/0267098 A1    Oct. 25, 2012

Related U.S. Application Data

(60) Provisional application No. 61/477,865, filed on Apr. 21, 2011.

(51) Int. Cl.
| | | |
|---|---|---|
| E21B 33/13 | (2006.01) | |
| E21B 33/138 | (2006.01) | |
| C09K 8/502 | (2006.01) | |
| C09K 8/565 | (2006.01) | |
| C09K 8/524 | (2006.01) | |
| E21B 43/16 | (2006.01) | |
| E21B 19/22 | (2006.01) | |

(52) U.S. Cl.
CPC ............. *E21B 33/138* (2013.01); *C09K 8/502* (2013.01); *C09K 8/565* (2013.01); *C09K 8/524* (2013.01); *E21B 43/16* (2013.01); *E21B 19/22* (2013.01)

(58) Field of Classification Search
CPC ....... E21B 33/138; E21B 43/16; E21B 19/22; C09K 8/502; C09K 8/524; C09K 8/565
USPC ........... 166/270, 272.1, 303, 288, 268, 272.6, 166/275, 392, 285, 292, 305.1
See application file for complete search history.

(56) References Cited

U.S. PATENT DOCUMENTS

| | | | |
|---|---|---|---|
| 2,799,341 A * | 7/1957 | Maly .............................. 166/288 |
| 3,684,012 A | 8/1972 | Scheffel et al. |
| 4,446,036 A | 5/1984 | Hsieh et al. |
| 4,766,959 A | 8/1988 | Allison |
| 4,842,070 A * | 6/1989 | Sharp ........................... 166/288 |
| 5,287,923 A | 2/1994 | Cornette et al. |
| 5,826,656 A | 10/1998 | McGuire et al. |
| 6,550,542 B2 | 4/2003 | Vienot |
| 8,146,654 B2 * | 4/2012 | Bragg et al. ............. 166/250.01 |

FOREIGN PATENT DOCUMENTS

GB    980579    1/1965

OTHER PUBLICATIONS

International Coiled Tubing Assoication, An Introduction to Coiled Tubing, 2005.*

* cited by examiner

Primary Examiner — Jennifer H Gay
Assistant Examiner — George Gray
(74) Attorney, Agent, or Firm — ConocoPhillips Company

(57) ABSTRACT

A method for sealing a breakthrough penetrating an injection well.

16 Claims, 1 Drawing Sheet

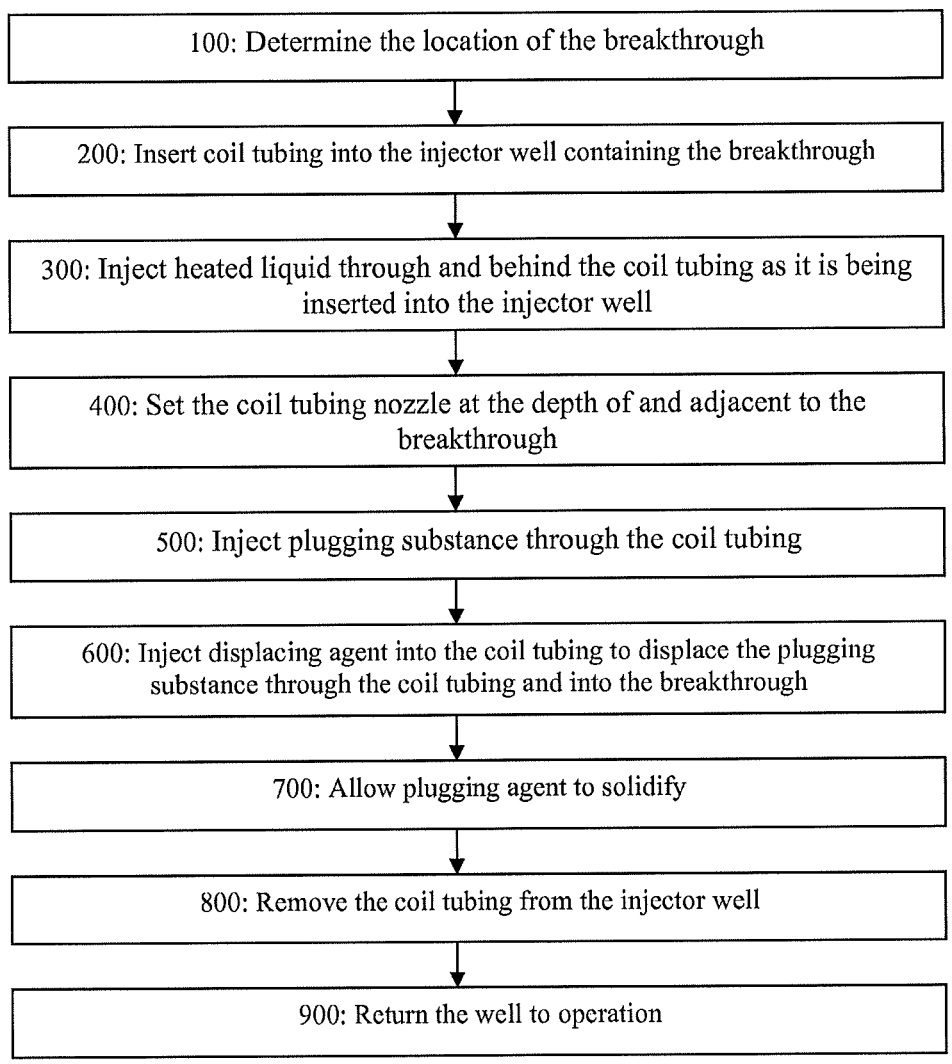

PROCESS OF SEALING A BREAKTHROUGH CREATED DURING THE PRODUCTION OF HYDROCARBONS IN A SUBTERRANEAN FORMATION

CROSS-REFERENCE TO RELATED APPLICATIONS

This application claims priority benefit under 35 U.S.C. Section 119(e) to U.S. Provisional Patent Ser. No. 61/477,865 filed on Apr. 21, 2011 the entire disclosure of which is incorporated herein by reference.

FIELD OF THE INVENTION

This invention relates to a method for sealing a breakthrough penetrating an injection well.

BACKGROUND OF THE INVENTION

Many oil fields are comprised of reservoirs wherein the injection wells involving with a waterflood operation have or develop direct or indirect pressure communication with offset production wells. When this pressure communication develops, the producer well exhibits a breakthrough of injected water and thus an increase in the water-to-oil ratio and a decrease in oil production. The waterflood process may become effectively broken as a result. This breakthrough of injection water is a serious disadvantage which typically becomes more prevalent as an oil field matures.

Though there may be communication, the injector well may still hold injection pressure suggesting that the flooding operation of the reservoir has not completely failed. The pressure difference between the bottom hole injection well pressure and the bottom hole production well pressure can range up to thousands of pounds per square inch (psi). When communication occurs, this pressure differential will decrease. In severe instances, such as a matrix bypass event or "MBE" functional waterflood can completely fail which is signified by the bottom hole injection pressure of the injector becoming nearly equal to the bottom hole producing pressure of the producer.

Matrix bypass events (MBE's) are a particular problem in the waterflooding of many heavy/viscous oil reservoirs and are believed to develop gradually due to heavy oil production with sand from unconsolidated formations containing heavy oil. In some areas of the world, MBE's may be referred to as 'worm holes'. The water injector well develops non-matrix communication with the oil production well. "Non-matrix" communication refers to the normal matrix pressure transient communication, which occurs in a functional waterflood between injector and producer via interconnected formation "matrix" pore spaces. When the matrix pore spaces between sand grains suddenly become replaced by a new form of pressure transient communication via a large open channel we call an MBE which has infinite 'non-matrix' conductivity of pressure acting between the wellbores. Thus, matrix sweep of oil ceases. The presence of an MBE can be inferred in most cases where the difference in pressure between the bottom hole injection well pressure and the bottom hole production well pressure ($\Delta P_{bh}$) shows a significant decrease over a relatively short period of time, such as a change in $\Delta P_{bh}$ on the order of at least 100 psi over a 12 hour time period. However, it is not uncommon to see at least a several hundred psi ($\Delta P_{bh}$) swing in less than an hour on MBE's. In the most severe MBE cases, the final pressure differential ($\Delta P_{bh}$) between injector and producer may become less than 200 psi and even less than 100 psi, i.e., the bottom hole injection pressure of the water injector approaches and nearly equals the bottom hole production pressure of the producer. This short circuit of the functional waterflood can render continued injection ineffective and halts oil recovery, since the injector and producer pair will now only cycle water through the infinitely conductive MBE pathway.

Several methods exist for sealing MBE's. One such method involves the placement of solid granular materials (i.e., sand, silts, calcium carbonate, etc.) pumped as slurry into the MBE in an attempt to fill the MBE with new matrix material to seal the MBE. These materials are pumped either "full bore" directly down the tubing typically in a gelled carrying fluid as a slurry, or may be pumped down coil tubing to the MBE as a slurry. The disadvantage of this method is that there is no matrix cementation material to hold the solid particles together in aggregate once the solids have been placed in the MBE, so the solids will tend to wash out of the MBE following renewed injection at the injector. Another disadvantage is possible "bridging" problems of the solid materials trying to pass narrow slotted liner slots to an MBE. There is also a possibility of shallow bridging in the MBE as well, should solids successfully pass the liner into the MBE. Another disadvantage is possible settling of the solids out of the slurry before they transport very far or at all into the MBE channel.

Another method for sealing MBE's uses a gel material to seal the MBE, by pumping gel full-bore or through coil tubing to the MBE. One problem with gels is that most gels normally require a crosslinker added to the pumped gelant which later causes the gelant to "gel" to create a very viscous gel plug. Crosslinkers require certain temperatures to activate the formation of gel, and in some reservoirs the temperatures needed do not exist in range of what is required to activate the crosslinker. Gels also do not typically result in a very solid plug once set in an MBE, and thus may not offer enough shear resistance to renewed injection into the injector following an MBE sealing job. Gels can also be quite expensive and certain chemistry issues can be fairly complex to manage properly on gel jobs.

Use of cement pumping either full-bore down the tubing or through coil tubing is another method to seal an MBE. This method can provide a very shear resistant plug in an MBE provided cement can actually be placed into the MBE for any appreciable distance. Most cements are very viscous and are therefore often difficult to place very far into an MBE, thus it is quite likely that a long MBE channel may be left mostly unfilled by cement that cannot penetrate the MBE very far. Cement may also have difficulty passing thin slotted liner slots, and cement jobs can be quite expensive. Cement sets very hard as solid, so any cement that fails to exit through the liner to the MBE during pumping may result in a costly cement milling job to reopen the wellbore following a cement attempt of an MBE. Some synthetic cement blends do exist that can be pumped as a low viscosity flowing liquid, and these products set solid like cement. These cements can pass slotted liner slots more easily than conventional cements, but these products are very expensive and may also require milling if they set inadvertently inside the wellbore.

While these methods may block or isolate the fluid flow, the materials employed may not provide a complete seal, or any blockage may only be temporary, resulting in a relatively rapid reoccurrence of fluid influx.

When a well has an MBE, it is typical that all water injection entering the well will be transported to the producer via the open MBE without displacing any more oil to the producer. At this point, effective "matrix water flooding" of the oil reserves in the flood area is broken. MBE's not sealed must be isolated in some way from the rest of the wellbore in order to block entry of injection water to the MBE, if the well is to be salvaged for restoring some functional matrix water flood to regain displacement of oil reserves between the injector and the offset producer.

For example, in a tri-lateral injector well, the lateral with the MBE must be blinded off using a plug or an isolation sleeve before the other two laterals can be placed back on injection service. Until the MBE offending lateral has been isolated, no water will waterflood the two laterals unaffected by an MBE even though they are open to receive injection. This is true because the path of least resistance for injection water is to flow to the highly conductive MBE rather than divert into matrix waterflood injection patterns.

Therefore, a need exists for permanently sealing breakthroughs created during the production of hydrocarbons in a subterranean formation.

SUMMARY OF THE INVENTION

In one embodiment, a process for sealing a breakthrough penetrating a wellbore in a subterranean formation includes: (a) locating the breakthrough; (b) inserting a tubing into the wellbore; (c) injecting a heated liquid through and behind the tubing as the tubing is being inserted into the wellbore; (d) setting the tubing at the depth of and adjacent to the breakthrough; (e) injecting a plugging substance the tubing; (f) injecting a displacing agent into the tubing; (g) allowing the plugging substance to solidify; (h) removing the tubing from the wellbore; and (i) returning the injector well to operations.

In another embodiment, a process for sealing a breakthrough penetrating a wellbore in a subterranean formation includes: (a) locating the breakthrough; (b) inserting a coil tubing into the injector well; (c) injecting a heated liquid through and behind the coil tubing as the coil tubing is being inserted into the injector well, wherein the heated liquid is heated water, wherein the heated liquid is dependent on the temperature of the wellbore and melt point of a plugging substance; (d) setting the coil tubing at the depth of and adjacent to the breakthrough; (e) injecting a plugging substance into the coil tubing, wherein the melting point of the plugging substance is dependent at least partially on the temperature of the wellbore, wherein the plugging substance is a paraffin wax; (f) injecting the displacing agent into the coil tubing, wherein the displacing agent is heated diesel or water, wherein the temperature of the displacing agent is dependent on the melting point of the plugging substance; (g) allowing the plugging substance to solidify; (h) removing the coil tubing from the injector well; and (i) returning the injector well to operation.

In yet another embodiment, a process for sealing a breakthrough penetrating a wellbore in a subterranean formation includes: (a) locating the breakthrough, wherein the breakthrough is a matrix bypass event; (b) inserting a tubing into the wellbore, wherein the tubing is coil tubing; (c) injecting a heated liquid through and behind the tubing as the tubing is being inserted into the wellbore, wherein the temperature of the heated liquid is dependent on the temperature of the wellbore, wherein the heated liquid is diesel or water; (d) setting the tubing at the depth of and adjacent to the breakthrough; (e) injecting a plugging substance the tubing, wherein the plugging substance is molten wax, wherein the melting point of the plugging substance is at least partially dependent on the temperature of the wellbore, wherein the melting point of the plugging substance is at least 105° F.; (f) injecting a displacing agent into the tubing, wherein the displacing agent is heated diesel or water, wherein the temperature of the displacing agent is dependent on the temperature of the wellbore and the melting point of the plugging substance, wherein the temperature of the displacing agent is at least 105° F.; (g) allowing the plugging substance to solidify; (h) removing the tubing from the wellbore; and (i) returning the injector well to operation after at least one day has elapsed.

BRIEF DESCRIPTION OF THE DRAWINGS

The invention, together with further advantages thereof, may best be understood by reference to the following description taken in conjunction with the accompanying drawings in which:

FIG. 1 is a flow chart of the basic steps in some embodiment of the present invention.

DETAILED DESCRIPTION OF THE INVENTION

Reference will now be made in detail to embodiments of the present invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used in another embodiment to yield a still further embodiment. Thus, it is intended that the present invention cover such modifications and variations that come within the scope of the appended claims and their equivalents.

A flowchart of steps that may be utilized by embodiments of the present invention is illustrated in FIG. 1. The functions noted in the various blocks may occur out of the order depicted in FIG. 1. For example, two blocks shown in succession in FIG. 1 may in fact be executed substantially concurrently, or the blocks may sometimes be executed in the reverse order depending upon the functionality involved.

In step 100, the location of the breakthrough penetrating the injection well is determined. An injection profile log is utilized to determine the location of the breakthrough within the injection well. The breakthrough may be a matrix bypass event.

In step 200, tubing is inserted into the well containing the breakthrough. The tubing may be inserted into an injection well containing the breakthrough. On the injector side, the MBE opening may be found as a singular large opening to the formation along the wellbore. This formation makes the MBE easy to locate using a logging tool and this side of an MBE is much easier to pump treatment fluids into to achieve good penetration deep into the formation with the treatment fluids and seal the MBE. The tubing may be inserted into a producer well end of a breakthrough. Producer wells often have large amounts of sand, debris, or down hole submersible pumps in the way, which will inhibit accessibility with coil tubing into the well. MBE's are also believed to become dendritic in form toward the producer side of an MBE. This means the breakthrough event could manifest itself as several small channels, with smaller diameter openings located at several different depths along the producer. The tubing may also be coil tubing.

In step 300, a heated liquid is injected through and behind the tubing as it is being inserted into the injector well. A large volume of heated liquid is pumped through and behind the tubing, in order to warm the well. The temperature of the water is dependent on the climate conditions at the well. Injecting heated liquid through and behind the coil tubing is necessary, especially in arctic regions, to retard cooling rates from the permafrost zone surrounding the upper sections of the wellbore and to mitigate solidification potential of the plugging substance in the coil tubing. For example, in Alaska, on the North Slope, up to about 2000 vertical feet of permafrost thickness surrounds the upper section of wellbores. Most of the wells on the North Slope are drilled at inclined angles through the permafrost zone to locate bottom hole locations of wellbores at production targets that may be offset at a large lateral distance away from the drill pad. This results in the total footage of wellbore actually exposed to the permafrost zone being significantly greater than the true vertical thickness of the permafrost zone. Warming the wellbore by injecting heated liquid through and behind the tubing should occur prior to the injection of the plugging substance in order to prevent solidification of the substance in the coil tubing prior to displacing the plugging substance from the coil into the MBE. However, in other regions of the world with much warmer geothermal gradients, preheating the well prior to treating the well may not be necessary.

The heated liquid may be heated water. In arctic locations, such as the North Slope where permafrost is a concern, water temperatures below 130° F. fail to transfer enough heat into the well to significantly warm the permafrost exposed wellbore section enough at pump rates that can be achieved into a well.

In step 400, the tubing is set at the depth of and adjacent to the breakthrough. As the heated liquid is pumped through and behind the coil tubing, the nozzle of the coil tubing is set at the depth and adjacent to the breakthrough.

In step 500, a plugging substance is injected into the tubing. Immediately following the injection of the heated liquid into the wellbore, a small volume low melting point plugging substance is pumped through the tubing at a predetermined pump rate. The plugging substance may be molten wax. In an arctic environment, for example, with cold surface temperatures, the wax will continuously cool from the time it leaves the melting tank to the time it reaches the MBE. The transport time from wax tank to the MBE is a function of coil tubing volume and pump rate. Changes in the temperature of the wax from melting tank to an MBE is also a function of air temperature, wind speed against the coil tubing reel, length of wellbore section exposed to the permafrost zone, depth of the MBE, etc. The operator may determine that with all these factors considered, that the wax be heated to at least 180° F. on the surface before attempting to pump it down the coil tubing expecting to get wax to the MBE as liquid.

The pump rate of the plugging substance through the tubing must be high enough to ensure that the breakthrough is held open to accept all of the plugging substance injected and to ensure that the plugging substance will be placed into the breakthrough as quickly as possible to limit temperature loss enough to keep wax as liquid all the way through the coil tubing. The pump rate of the plugging substance into the coil tubing may be about 1.0 to about 1.75 barrels of plugging substance per minute.

The molten wax to be injected into the coil tubing to seal the breakthrough may have a low melting point. The melting point of the molten wax is dependent on the climate conditions of the well and the type of tubing utilized. It is generally desirable to adjust the pump rate to displace wax out of the coil tubing nozzle just a few degrees Fahrenheit above the melting point Fahrenheit temperature of the wax, in order to allow the wax to solidify quickly once it inside the MBE and surrounded by cool formation temperature. There is a good correlation between wax hardness as solid and wax melting point. Per this correlation, the higher the melting point of the wax that can be pumped, the harder the wax plug will be once it solidifies inside the MBE. Harder wax is likely to better withstand injection pressure following a treatment, and may be less likely to fail due to the injection pressure acting on the wax plug trying to force it out of the MBE. An operational risk with higher melting point wax is that it may be difficult to remove from coil tubing should it solidify inadvertently in coil tubing. If a low melting point plugging substance inadvertently becomes solid in the coil tubing, it can more likely be removed from the coil tubing by heating up the coil and flushing the coil with a solvent such as warm diesel or hot water.

In step 600, a displacing agent is injected into the coil tubing to displace the plugging substance through the coil tubing and into the breakthrough. Once all of the plugging substance has been pump drawn into the coil tubing from a tank, the displacing agent is then pump drawn from other tanks into the coil tubing to displace the plugging substance through the coil tubing and into the breakthrough. The displacing agent also serves to help clean up and dissolve any residual coating along the inside wall of the coil tubing. If the displacing agent is water, for example, it is pumped into the tubing at a temperature of approximately 180° F. to prevent any premature solidification of the molten wax slug at the wax/water interface inside tubing. If diesel is used as a displacing fluid, for example, a maximum surface temperature for diesel to be pumped is limited to no more than 140° F., due to safety concerns related to increasing volatility of diesel at elevated temperatures. The amount of displacing agent used is dependent on the coil tubing length. Once the displacement has occurred, all of the plugging agent from the coil tubing nozzle is displaced to the breakthrough, followed by immediate shutdown of all pumping into the well.

In step 700, the plugging agent is allowed to solidify. When the injection of various materials cease, the plugging agent in the breakthrough will solidify due to the low reservoir temperature surrounding the plugging agent filled breakthrough.

In step 800, the tubing is removed from injector well. Within several hours following shut down of pumping, the coil tubing is removed from the injector well. The continually cooling displacing agent is displaced from the coil after enough time has lapsed (at least 1 hour) to ensure that the plugging agent has become a solid plug in the breakthrough. The displacing fluid will remain in the tubing and across the permafrost zone (diesel) in the wellbore for freeze protection of the wellbore section through the permafrost zone.

In step 900, the well is returned to operations. After at least one (1) day of shut-in time to allow the plugging agent to cure, the well is returned to water injection. Pseudo-crystalline structure of newly solidifying wax can continue to build compressive strength and shear strength for several days. Thus, one (1) day of cure time is suggested as a minimum cure time. A five (5) day cure period should give near final achievable strengths. Consideration must be given as to the value of extending shut-in time to ensure a good seal of a breakthrough versus economic benefits of returning a well to service soon as possible.

For example, on the North Slop in Alaska use of coil tubing placement of the plugging substance into a well as opposed to full bore pumping of plugging substance into a well does not expose the entire wellbore to the plugging substance being pumped. Use of coil tubing allows the operator to "spot" the plugging substance at a particular depth where the MBE is located. Use of coil tubing accelerates transit time for moving the plugging substance from surface to MBE which expands the total population of wells that can be considered for treatment using the plugging substance. Use of coil tubing with real time downhole temperature and pressure data monitoring transmitted to surface read out also gives the operator knowledge of what the down hole temperature is at the coil nozzle at the MBE, so pump rates can be adjusted as needed to either lower or increase the plugging substance temperature expelled at the nozzle. Real-time down hole temperature data also helps the operator to place plugging substance out of the coil tubing at a controlled and optimized temperature. The operator adjusts the pump rate to try to have the plugging substance exit the coil to the MBE just a couple degrees above melting point of the plugging substance. This way, by design, the plugging substance injected into the MBE can solidify as quickly as possible before the plugging substance has a chance to possibly flow all the way through or back out of the MBE. In full bore pumping of the plugging substance, the operator is pumping "blind" with regard to real time knowledge of down hole temperature conditions at the MBE. Pumping through coil tubing without real time transmission of downhole temperature and pressure data is also pumping "blind." Pumping "blind" obviously limits the odds of achieving a successful treatment.

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A process for sealing a breakthrough penetrating a wellbore of an injector well in a subterranean formation comprising:
   a. locating the breakthrough;
   b. inserting a tubing into the wellbore;
   c. injecting a heated liquid through and behind the tubing as the tubing is being inserted into the wellbore;
   d. setting the tubing at the depth of and adjacent to the breakthrough;
   e. heating a plugging substance at the surface to at least 180° F.;
   f. injecting the heated plugging substance into the tubing and pumping the plugging substance through the tubing at a pump rate;
   g. adjusting the pump rate to displace the plugging substance out of the tubing at a temperature above a melting point Fahrenheit temperature of the plugging substance, the temperature above the melting point being limited such that the time required for the plugging substance to solidify once the plugging substance is inside the breakthrough is minimized;
   h. injecting a displacing agent into the tubing;
   i. allowing the plugging substance to solidify;
   j. removing the tubing from the wellbore; and
   k. returning the injector well to operations.

2. The process according to claim 1, wherein the breakthrough is a matrix bypass event.

3. The process according to claim 1, wherein the tubing is coil tubing.

4. The process according to claim 1, wherein the temperature of the heated liquid is dependent on the temperature of the wellbore.

5. The process according to claim 1, wherein the heated liquid is diesel or water.

6. The process according to claim 1, wherein the heated liquid is at least 130° F.

7. The process according to claim 1, wherein the heated liquid is between about 130° F. and about 180° F.

8. The process according to claim 1, wherein the plugging substance is molten wax.

9. The process according to claim 8, wherein the plugging substance is a paraffin wax.

10. The process according to claim 1, wherein the melting point of the plugging substance is dependent on the temperature of the wellbore.

11. The process according to claim 1, wherein the plugging substance has a melting point between about 105° F. and about 130° F.

12. The process according to claim 1, wherein the displacing agent is heated diesel or water.

13. The process according to claim 1, wherein the temperature of the displacing agent is dependent on the temperature of the wellbore and melting point of the plugging substance.

14. The process according to claim 1, wherein the temperature of the displacing agent is at least 105° F.

15. A process for sealing a breakthrough penetrating a wellbore of an injector well in a subterranean formation comprising:
   a. locating the breakthrough;
   b. inserting a coil tubing into the injector well;
   c. injecting a heated liquid through and behind the coil tubing as the coil tubing is being inserted into the injector well, wherein the heated liquid is heated water, wherein the heated liquid is dependent on the temperature of the wellbore and melt point of a plugging substance;
   d. setting the coil tubing at the depth of and adjacent to the breakthrough;
   e. heating a plugging substance at the surface to at least 180° F.;
   f. injecting the heated plugging substance into the coil tubing and pumping the plugging substance through the coil tubing at a pump rate;
   g. adjusting the pump rate to displace the plugging substance out of the tubing at a temperature above the melt point Fahrenheit temperature of the plugging substance, the temperature above the melting point being limited such that the time required for the plugging substance to solidify once the plugging substance is inside the breakthrough is minimized, wherein the melting point of the plugging substance is dependent at least partially on the temperature of the wellbore, wherein the plugging substance is a paraffin wax;
   h. injecting the displacing agent into the coil tubing, wherein the displacing agent is heated diesel or water, wherein the temperature of the displacing agent is dependent on the melting point of the plugging substance;
   i. allowing the plugging substance to solidify;
   j. removing the coil tubing from the injector well; and
   k. returning the injector well to operation.

16. A process for sealing a breakthrough penetrating a wellbore of an injector well in a subterranean formation comprising:
   a. locating the breakthrough, wherein the breakthrough is a matrix bypass event;
   b. inserting a tubing into the wellbore, wherein the tubing is coil tubing;
   c. injecting a heated liquid through and behind the tubing as the tubing is being inserted into the wellbore, wherein the temperature of the heated liquid is dependent on the temperature of the wellbore, wherein the heated liquid is diesel or water;
   d. setting the tubing at the depth of and adjacent to the breakthrough;
   e. heating a plugging substance at the surface to at least 180° F.;
   f. injecting the heated plugging substance the tubing, wherein the plugging substance is molten wax, wherein the melting point of the plugging substance is at least partially dependent on the temperature of the wellbore, wherein the melting point of the plugging substance is at least 105° F.;
   g. adjusting a pump rate of the plugging substance to displace the plugging substance out of the tubing at a temperature above the melting point Fahrenheit temperature of the plugging substance, the temperature above the melting point being limited such that the time required for the plugging substance to solidify once the plugging substance is inside the breakthrough is minimized;
   h. injecting a displacing agent into the tubing, wherein the displacing agent is heated diesel or water, wherein the temperature of the displacing agent is dependent on the temperature of the wellbore and the melting point of the plugging substance, wherein the temperature of the displacing agent is at least 105° F.;
   i. allowing the plugging substance to solidify;
   j. removing the tubing from the wellbore; and
   k. returning the injector well to operation after at least one day has elapsed.

* * * * *